(12) United States Patent
Boday et al.

(10) Patent No.: US 9,663,610 B2
(45) Date of Patent: May 30, 2017

(54) CATALYST-LEAN, MICROCAPSULE-BASED SELF-HEALING MATERIALS VIA RING-OPENING METATHESIS POLYMERIZATION (ROMP)

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/505,987

(22) Filed: Oct. 3, 2014

(65) Prior Publication Data
US 2016/0096956 A1 Apr. 7, 2016

(51) Int. Cl.
| | | |
|---|---|---|
| *C08G 61/08* | (2006.01) | |
| *C08L 65/00* | (2006.01) | |
| *B29C 73/22* | (2006.01) | |

(52) U.S. Cl.
CPC ............ *C08G 61/08* (2013.01); *B29C 73/22* (2013.01); *C08L 65/00* (2013.01); *C08G 2261/1624* (2013.01); *C08G 2261/3324* (2013.01); *C08G 2261/418* (2013.01); *C08L 2205/02* (2013.01); *C08L 2205/03* (2013.01)

(58) Field of Classification Search
CPC ............ B32B 2307/762; C09D 5/08; A61L 2300/622; C08K 9/10; C08F 2/22; B01J 13/22; C08G 61/08; C08G 2261/418; C08G 2261/1624; C08G 2261/3324; C08L 65/00; C08L 2205/02
See application file for complete search history.

(56) References Cited

U.S. PATENT DOCUMENTS

| | | |
|---|---|---|
| 7,108,914 B2 | 9/2006 | Skipor et al. |
| 7,125,915 B2 | 10/2006 | Harris et al. |
| 7,566,747 B2 | 7/2009 | Moore et al. |
| 7,799,849 B2 | 9/2010 | Raravikar et al. |
| 8,273,806 B2 | 9/2012 | Guadagno et al. |
| 2009/0036568 A1* | 2/2009 | Merle ............... B01J 13/18 523/206 |
| 2012/0165432 A1 | 6/2012 | Bateman et al. |
| 2012/0288537 A1 | 11/2012 | Schwendeman et al. |
| 2012/0321828 A1 | 12/2012 | Jolley et al. |

OTHER PUBLICATIONS

Mauldin et al. J. Mater. Chem. 2010, 20, 4198-4206.*
Wikipedia contributors, "Grubbs' catalyst", Wikipedia, The Free Encyclopedia, http://en.wikipedia.org/w/index.php?oldid=617898045 (accessed Aug. 27, 2014).
Wikipedia contributors, "Ring-opening metathesis polymerization", Wikipedia, The Free Encyclopedia, http://en.wikipedia.org/w/index.php?oldid=622232970 (accessed Aug. 27, 2014).
Schrodi et al., "Evolution and Applications of Second-Generation Ruthenium Olefin Metathesis Catalysts", Aldrichimica Acta, vol. 40, No. 2, 2007, pp. 45-52.
Tomasek et al. "Olefin metathesis in aqueous media", Green Chemistry, vol. 15, 2013, pp. 2317-2338.
Mauldin et al., "Enhanced bulk catalyst dissolution for self-healing materials", Journal of Materials Chemistry, vol. 20, 2010, pp. 4198-4206.
"Chapter 6—Ring-Opening Metathesis Polymerization of Functionalized-Low-Strain Monomers with Ruthenium-Based Catalysts", printed from <http://thesis.library.caltech.edu/778/8/chapter6.pdf> on Sep. 12, 2014, pp. 72-86.
Wipf P., "Chem 1410—Ring Opening Metathesis Polymerization of Cyclooctadiene", printed from <http://ccc.chem.pitt.edu/wipf/courses/1140_05_files/ROMP.pdf> on Sep. 12, 2014, 2 pages.

* cited by examiner

*Primary Examiner* — Margaret Moore
(74) *Attorney, Agent, or Firm* — Matthew J. Bussan

(57) ABSTRACT

A self-healing composite material includes a polymer matrix, microcapsules filled with a ring-opening metathesis-active monomer (e.g., norbornene, norbornene derivatives such as ethylidene norbornene, or cyclooctadiene), and polymeric particles comprised of a polymer that is soluble in the monomer with which the microcapsules are filled and having catalytic endgroups derived from an olefin metathesis catalyst, such as a Grubbs'-type catalyst. In some embodiments, the polymer having catalytic endgroups is synthesized via solution polymerization of a ring-opening metathesis-active monomer (e.g., norbornene, norbornene derivatives, or cyclooctadiene) in the presence of an olefin metathesis catalyst (e.g., Grubbs' 1st generation catalyst). The polymer having catalytic endgroups may then be processed via a grinding operation, for example, to prepare the small polymeric particles. In other embodiments, the polymeric particles are synthesized directly as microparticles (e.g., microspheres, granules, beads, etc.) utilizing an analogous suspension polymerization.

18 Claims, 4 Drawing Sheets

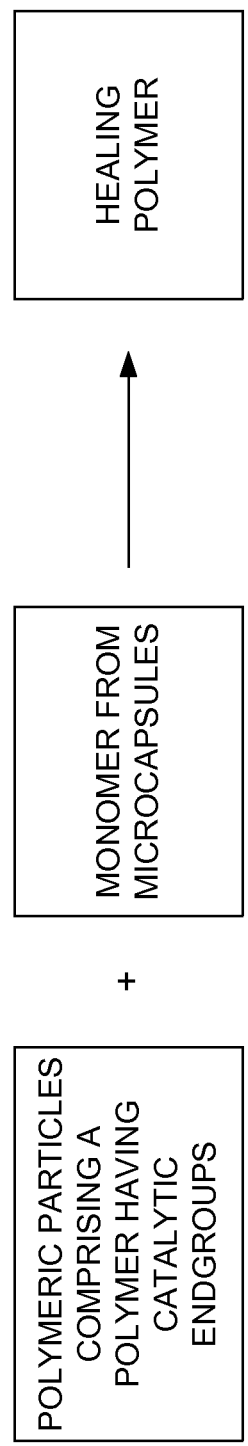

CATALYST-LEAN, MICROCAPSULE-BASED SELF-HEALING MATERIALS VIA RING-OPENING METATHESIS POLYMERIZATION (ROMP)

BACKGROUND

The present invention relates in general to the field of self-healing materials. More particularly, the present invention relates to a self-healing composite material having a polymer matrix, microcapsules filled with a ring-opening metathesis-active monomer, and polymeric particles comprised of a polymer that is soluble in the monomer with which the microcapsules are filled and having catalytic endgroups derived from an olefin metathesis catalyst.

SUMMARY

In accordance with some embodiments of the present invention, a self-healing composite material includes a polymer matrix, microcapsules filled with a ring-opening metathesis-active monomer (e.g., norbornene, norbornene derivatives, or cyclooctadiene), and polymeric particles comprised of a polymer that is soluble in the monomer with which the microcapsules are filled and having catalytic endgroups derived from an olefin metathesis catalyst, such as a Grubbs'-type catalyst. In some embodiments, the polymer having catalytic endgroups is synthesized via solution polymerization of a ring-opening metathesis-active monomer (e.g., norbornene, norbornene derivatives such as ethylidene norbornene, or cyclooctadiene) in the presence of an olefin metathesis catalyst (e.g., Grubbs' 1st generation catalyst). The polymer having catalytic endgroups may then be processed via a grinding operation, for example, to prepare the small polymeric particles. In other embodiments, the polymeric particles are synthesized directly as microparticles (e.g., microspheres, granules, beads, etc.) utilizing an analogous suspension polymerization.

BRIEF DESCRIPTION OF THE SEVERAL VIEWS OF THE DRAWINGS

Embodiments of the present invention will hereinafter be described in conjunction with the appended drawings, where like designations denote like elements.

FIG. 4 is a general reaction scheme diagram illustrating the synthesis of a healing polymer produced during a healing event in accordance with some embodiments of the present invention.

DETAILED DESCRIPTION

Figure 1:
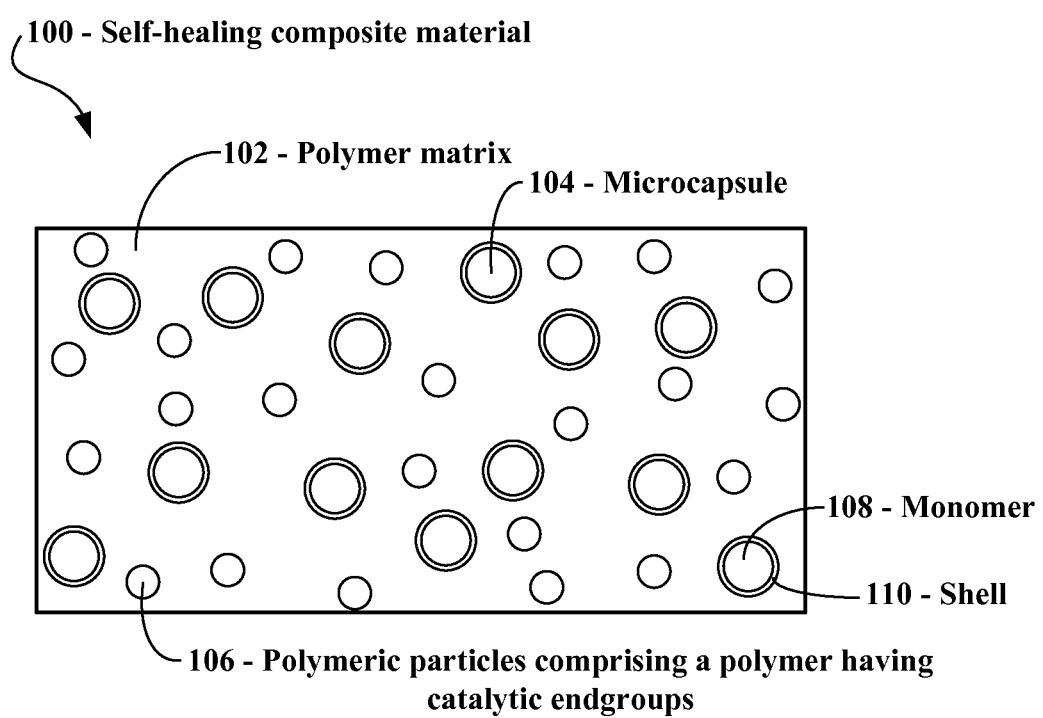
FIG. 1 illustrates a cross-sectional view of a self-healing composite material in accordance with some embodiments of the present invention.

Microcapsule-based self-healing has recently emerged as a powerful tool for autonomic damage mitigation in polymers. Such self-healing polymers are extremely attractive for a number of applications, but highly sought for those in which damage detection is difficult and repair would be costly and/or dangerous. In conventional self-healing polymers, catalyst particles and liquid monomer-containing microcapsules are embedded in a base polymer for which healing is desired. Upon damage, the microcapsules are ruptured, releasing liquid monomer into the damage volume, which subsequently polymerizes when in contact with the catalyst particles, thereby adhering the damage surfaces without the need for manual intervention. Nearly a decade of research has identified liquid monomers susceptible to ring-opening metathesis polymerization (ROMP) in the presence of Grubbs'-type catalysts as optimal "healing additives," but commercial production of these materials is limited owing to the expensive Grubbs'-type catalysts, which contain the precious metal ruthenium (Ru). The catalyst particles used in conventional self-healing polymers are typically solid catalyst, i.e., the particles are essentially 100 wt % Grubbs'-type catalyst. Efforts to reduce the amount of catalyst needed for optimal self-healing exist, such as encasing catalyst particles in protective wax media (i.e., the resulting wax microparticles typically contain about 5 wt % to about 25 wt % Grubbs'-type catalyst), but these approaches still use a commercially infeasible amount of costly catalyst. Moreover, the protective wax media can be detrimental to the base polymer's material properties.

Ring-opening metathesis polymerization (ROMP) is a type of olefin metathesis chain-growth polymerization typically catalyzed by ruthenium-based carbine complexes, known as Grubbs' catalysts. The driving force of the ROMP reaction is relief of ring strain in cyclic olefins, such as norbornene, ethylidene norbornene, and cyclooctadiene, having a strained cyclic structure. Such cyclic olefins are referred to herein as ring-opening metathesis-active monomers.

Numerous Grubbs' catalysts are known in the art (e.g., Grubbs' 1st generation catalyst, Grubbs' 2nd generation catalyst, Grubbs' 3rd generation catalyst, Hoveyda-Grubbs' 1st generation catalyst, Hoveyda-Grubbs' 2nd generation catalyst, etc.). Grubbs' catalysts are ruthenium based. For purposes of this document, including the claims, Grubbs' catalysts are collectively referred to herein as Grubbs'-type catalysts. One skilled in the art will appreciate, however, that other olefin metathesis catalysts, such as Schrock-type catalysts (which are molybdenum based), may be used in lieu of, or in addition to, Grubbs'-type catalysts to synthesize the polymer having catalytic endgroups in accordance with some embodiments of the present invention.

Olefin metathesis is a reaction between two molecules containing carbon-carbon double bonds. Fragments of alkenes (olefins) bonded to the carbon-carbon double bonds are redistributed between the molecules, to produce two new molecules containing double bonds with swapped alkenes.

In accordance with some embodiments of the present invention, a self-healing composite material includes a polymer matrix, microcapsules filled with a ring-opening metathesis-active monomer (e.g., norbornene, norbornene derivatives, or cyclooctadiene), and polymeric particles comprised of a polymer that is soluble in the monomer with which the microcapsules are filled and having catalytic endgroups derived from an olefin metathesis catalyst, such as a Grubbs'-type catalyst. In some embodiments, the polymer having catalytic endgroups is synthesized via solution polymerization of a ring-opening metathesis-active monomer (e.g., norbornene, norbornene derivatives such as ethylidene norbornene, or cyclooctadiene) in the presence of an olefin metathesis catalyst (e.g., Grubbs' 1st generation catalyst). The polymer having catalytic endgroups may then be processed via a grinding operation, for example, to prepare the small polymeric particles. In other embodiments, the polymeric particles are synthesized directly as microparticles (e.g., microspheres, granules, beads, etc.) utilizing an analogous suspension polymerization.

The present invention employs a fundamentally different catalyst storage technique than utilized in conventional self-healing composite materials. That is, in accordance with the present invention, catalyst is embedded in polymer endgroups. The catalytic endgroups of the polymeric particles make up an extremely small percentage of the overall weight of the polymeric particles. Typically, the polymeric particles contain from about 3 wt % to about 10 wt % catalytic endgroups.

The polymeric particle loading in the self-healing composite material (i.e., the weight of the polymeric particles as a percentage of the combined weight of the polymer matrix, the microcapsules and the polymeric particles) typically ranges from about 0.5 wt % to about 5 wt %.

Hence, the overall catalyst concentration in the self-healing composite material can be extremely small in accordance with the present invention but still effectively catalyze a homogeneous polymerization of the liquid ring-opening metathesis-active monomer released from the ruptured microcapsules, as discussed below. Typically, the overall catalyst concentration in the self-healing composite material ranges from about 0.05 wt % to about 0.5 wt %. Such extremely low overall catalyst concentrations are possible because the catalyst exists only at the molecular level as polymer endgroups.

In accordance with some embodiments of the present invention, a microcapsule-based self-healing composite material contains conventional liquid monomer-filled microcapsules as well as small polymeric particle additives in place of the costly Grubbs'-type catalyst particles (which are typically solid catalyst particles, i.e., the particles are essentially 100 wt % catalyst). These polymeric particle additives are soluble in the liquid monomer contained inside the microcapsules, and they are made in such a way that they contain living (i.e., non-dormant) Grubbs'-type catalyst endgroups capable of catalyzing ROMP. The advantage of such embodiments of the present invention over traditional microcapsule-based self-healing polymers is three-fold. First, the amount of expensive catalyst needed for self-healing is drastically reduced (i.e., the self-healing composite material is catalyst-lean) since the Grubbs'-type catalyst is not directly added to the base polymer as discreet solid catalyst particles, but instead exists only at the molecular level as polymer endgroups. That is, the polymeric particles added to the base polymer comprise a polymer having catalytic endgroups derived from the Grubbs'-type catalyst. These catalytic endgroups make up a relatively small portion of the weight of the polymeric particles.

Second, the composition of the polymeric particles—which are made up of a polymer with catalytic endgroups—is strategically chosen so that the polymeric particles rapidly dissolve in the encapsulated liquid monomer, leading to a homogenous polymerization of the liquid monomer during healing. This is contrary to the largely heterogeneous polymerization of the slow-dissolving Grubbs'-type catalyst particles (including wax-protected Grubbs' catalyst) in traditional self-healing polymers, which depresses healing kinetics. The polymeric particles are homogeneously distributed within the polymer matrix and, thus, in the event of fracture or cracking, the catalytic endgroups of the polymer that comprises the polymeric particles are present within the damage volume in sufficient quantity to effectively catalyze a homogeneous polymerization of the liquid monomer released from the ruptured microcapsules. Moreover, the composition of the polymeric particles is strategically chosen so that during healing the polymeric particles will rapidly dissolve in the liquid monomer released from the ruptured microcapsules, leading to a rapid and homogenous polymerization of the liquid monomer Third, the use of polymeric particle additives, instead of catalyst particles, presents an additional control parameter, as polymeric particle additives are known to impart useful properties (e.g., rubber toughening particles) to base polymers, whereas the Grubbs'-type catalyst particles (including wax-protected Grubbs' catalyst) in traditional self-healing polymers are often detrimental to the base polymer's material properties.

Hence, economic issues, scale-up obstacles, and unfavorable mechanical properties of Grubbs'-type catalyst particles in traditional self-healing polymers are overcome by the self-healing composite material in accordance with some embodiments of the present invention.

Referring to FIG. 1, a cross-sectional view of a self-healing composite material 100 in accordance with some embodiments of the present invention is illustrated. The self-healing composite material 100 may comprise a base polymer 102 (also referred to herein as a "polymer matrix") embedded with microcapsules 104 and polymeric particles 106 comprising a polymer having catalytic endgroups. The catalytic endgroups of the polymer that comprises the polymeric particles 106 may be derived from an olefin metathesis catalyst, such as a Grubbs'-type catalyst. The polymeric particles 106 are provided in the self-healing composite material 100 to increase a rate of polymerization of a ring-opening metathesis-active monomer 108 provided in the microcapsules 104, when the monomer 108 comes into contact with the polymeric particles 106. Each of the microcapsules 104 includes a shell 110 (e.g., urea formaldehyde) that encapsulates the ring-opening metathesis-active monomer 108 and that is configured to rupture in the event of fracture or cracking of the base polymer 102. The ring-opening metathesis-active monomer 108 that fills the microcapsules 104 and the polymer that comprises the polymeric particles 106 are chosen so that the polymer is soluble in the ring-opening metathesis-active monomer 108.

The polymeric particles 106 are comprised of a polymer that is soluble in the monomer 108 with which the microcapsules 104 are filled and the have catalytic endgroups derived from an olefin metathesis catalyst, such as a Grubbs'-type catalyst. An example of a polymer having catalytic endgroups suitable for use in a self-healing composite material in accordance with some embodiments of the present invention is the ethylidene norbornene-derived polymer having catalytic endgroups shown immediately below,

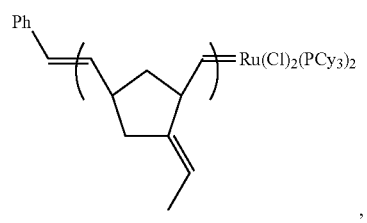

wherein Ph is a phenyl group, and wherein Cy is a cyclohexyl group. This exemplary polymer, which is non-limiting, is synthesized from a ring-opening metathesis polymerization of ethylidene norbornene in the presence of Grubbs' 1st generation catalyst. One skilled in the art will appreciate that a myriad of other polymers having catalytic endgroups suitable for use in a self-healing composite material in accordance with the present invention may be synthesized using one or more suitable ring-opening metathesis-active monomers (i.e., in lieu of, or in addition to, ethylidene norbornene) and one or more suitable Grubbs-type catalysts and/or other metathesis catalysts (i.e., in lieu of, or in addition to, Grubbs' 1st generation catalyst).

Suitable ring-opening metathesis-active monomers for use in synthesizing the polymeric particles 106 generally include, but are not limited to, norbornene, norbornene derivatives such as ethylidene norbornene, cyclooctadiene, cyclooctadiene derivatives, cyclooctene, cyclooctene derivatives such as 3-alkyl-substituted cis-cyclooctenes (3-R-COEs, R=methyl, ethyl, hexyl, and phenyl), and combinations thereof. Generally, ring-opening metathesis-active monomers are cyclic monomers with a strained cyclic structure. As noted above, however, the selection of the ring-opening metathesis-active monomer for use in synthesizing the polymeric particles 106 and the selection of the ring-opening metathesis-active monomer 108 of the microcapsules 104 are interdependent because the polymeric particles 106 must be soluble in the monomer 108. Some ring-opening metathesis-active monomers, such as dicyclopentadiene (DCPD), that polymerize to form crosslinked networks, such as a polyDCPD network, are not suitable because the crosslinked networks are insoluble in the ring-opening metathesis-active monomer 108 of the microcapsules 104, and therefore the subsequent polymerization during a healing event is heterogeneous (rather than the desired homogeneous polymerization).

Suitable Grubbs'-type catalysts include, but are not limited to, Grubbs' 1st generation catalyst, Grubbs' 2nd generation catalyst, Grubbs' 3rd generation catalyst, Hoveyda-Grubbs' 1st generation catalyst, Hoveyda-Grubbs' 2nd generation catalyst, and combinations thereof. Generally, Grubbs'-type catalysts are ruthenium-based carbene complexes.

The polymer that comprises the polymeric particles 106 contains a plurality of repeating units, preferably having a degree of polymerization (DP) of at least 15-50. As noted above, the polymer that comprises the polymeric particles 106 is not crosslinked so that the polymeric particles 106 are soluble in the ring-opening metathesis-active monomer 108 of the microcapsules 104, and therefore the subsequent polymerization during a healing event is homogeneous.

The ring-opening metathesis-active monomer 108 of the microcapsules 104 may comprise one or more suitable monomers capable of undergoing ring-opening metathesis polymerization in the presence of an olefin metathesis catalyst and capable of dissolving the polymer that comprises the polymeric particles 106. Suitable monomers generally include, but are not limited to, norbornene, norbornene derivatives such as ethylidene norbornene, cyclooctadiene, and combinations thereof. As noted above, however, the selection of the ring-opening metathesis-active monomer 108 of the microcapsules 104 and the selection of the ring-opening metathesis-active monomer for use in synthesizing the polymeric particles 106 are interdependent because the polymeric particles 106 must be soluble in the monomer 108.

For example, in the case where the polymeric particles 106 comprise the above-illustrated exemplary ethylidene norbornene-derived polymer, an example of a ring-opening metathesis-active monomer suitable for use as the ring-opening metathesis-active monomer 108 of the microcapsules 104 is shown immediately below,

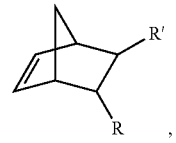

wherein R is a hydrogen atom, an alkyl group, an alkenyl group, or an aryl group, and wherein R' is a hydrogen atom, an alkyl group, an alkenyl group, or an aryl group. This exemplary ring-opening metathesis-active monomer is non-limiting. One skilled in the art will appreciate that a myriad of other ring-opening metathesis-active monomers suitable for use in a self-healing composite material in accordance with the present invention may be in lieu of, or in addition to, the above-illustrated exemplary ring-opening metathesis-active monomer.

Still referring to FIG. 1, we now turn to the synthesis of a healing polymer produced when the self-healing composite material 100 is subjected to a healing event. A crack, for example, may develop in or on the surface of the self-healing composite material 100. The crack (e.g., about 1-2 microns wide) may rupture nearby microcapsules 104 when the propagating crack comes in contact with the microcapsules 104. When this occurs, the ring-opening metathesis-active monomer 108 flows from the microcapsules 104 and fills-in the crack due to capillary action. As the ring-opening metathesis-active monomer 108 flows from the microcapsules 104, the monomer 108 comes into contact with the polymeric particles 106 comprising the polymer having catalytic endgroups. Contact between the ring-opening metathesis-active monomer 108 flowing from the ruptured microcapsules 104 and the polymeric particles 106 facilitates homogeneous ring-opening metathesis polymerization of the released monomer 108. The healing polymer is the product of this homogeneous polymerization. The polymerization is homogeneous because catalytic endgroups of the polymer that comprises the polymeric particles 106 are liberated as the polymer dissolves in the released monomer 108. As noted above, the polymeric particles 106 must be soluble in the monomer 108. The synthesis of the healing polymer via homogeneous polymerization of the monomer 108 in the crack may then seal the crack.

Figure 2:
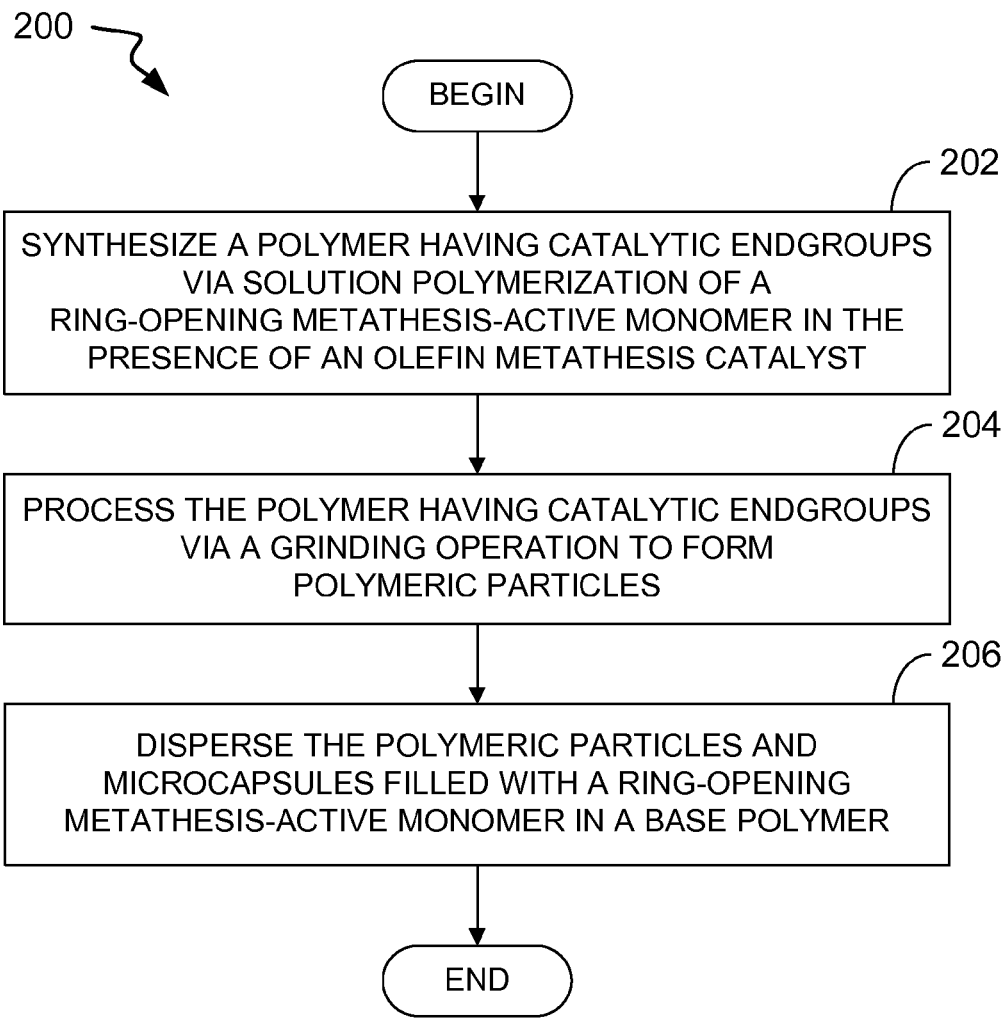
FIG. 2 illustrates a method that may be implemented to produce a self-healing composite material in accordance with some embodiments of the present invention.

Reference is now made to FIG. 2, in which is illustrated a method 200 that may be implemented to produce a self-healing composite material in accordance with some embodiments of the present invention. In the method 200, the steps discussed below (steps 202-206) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The method 200 begins by synthesizing a polymer having catalytic endgroups via solution polymerization, for example, of a ring-opening metathesis-active monomer (e.g., norbornene, ethylidene norbornene, or cyclooctadiene) in the presence of an olefin metathesis catalyst, such as a Grubbs'-type catalyst (step 202). One skilled in the art will appreciate that the polymer having catalytic endgroups may be synthesized using other suitable techniques known in the art, such as neat polymerization or suspension polymerization. In fact, suspension polymerization is advantageous in at least one respect—it is possible to form the polymeric particles directly in the suspension without post-ROMP processing (e.g., grinding, milling, or the like).

Then, the method 200 continues by processing the polymer having the catalytic endgroup via a grinding operation, for example, to form the polymeric particles (step 204). One skilled in the art will appreciate that the polymer may be processed using other suitable techniques known in the art, such as milling, to form the polymeric particles. The size (average diameter) of the polymeric particles may be, for example, about 10 μm to about 500 μm.

The method 200 ends by dispersing the polymeric particles and microcapsules filled with a ring-opening metathesis-active monomer in a base polymer to form the self-healing composite material (step 206). The polymeric particles and the microcapsules may be dispersed in the base polymer through any suitable technique known in the art. Suitable techniques include, but are not limited to, melt mixing, solution processing, and resin casting, depending on the type of base polymer. For example, resin casting is typically preferred when the base polymer is epoxy polymer.

The base polymer used in step 206 may comprise, for example, an epoxy polymer. One skilled in the art will appreciate that the base polymer may comprise any suitable polymer in lieu of, or in addition to, epoxy polymer. Suitable polymers include, but are not limited to: polyethers such as epoxides; polyamides such as nylons; polyesters such as poly(ethylene terephthalate) and polycaprolactone; polycarbonates; polyimides such as polypyromellitimide (e.g., KAPTAN); phenol-formaldehyde resins (e.g., BAKELITE); amine-formaldehyde resins such as a melamine resin; polysulfones; poly(acrylonitrile-butadienestyrene) (ABS); polyurethanes; polyolefins such as polyethylene, polystyrene, polyacrylonitrile, polyvinyls, polyvinylchloride (PVC), poly (DCPD) and poly(methyl methacrylate); polysilanes such as poly(carborane-siloxane); and polyphosphazenes. Furthermore, other components may be added to the base polymer, such as fibers, fillers, adhesion modifiers, blowing agents, anti-oxidants, colorants and dyes, and fragrances In step 206, the ring-opening metathesis-active monomer may be encapsulated in urea formaldehyde, for example, to form microcapsules. The liquid monomer-filled microcapsules may be synthesized using any suitable encapsulant and any suitable encapsulation procedure known in the art. Suitable encapsulants and suitable encapsulation procedures for making them include, but are not limited to: urea-formaldehyde, formed by in situ polymerization; gelatin, formed by complex coacervation; polyurea, formed by the reaction of isocyanates with a diamine or a triamine, depending on the degree of crosslinking desired (the extent of crosslinking also determines the brittleness of the capsule); and polyamide, formed by the use of a suitable acid chloride and a water soluble triamine. The size (average diameter) of the microcapsules may be, for example, about 10 μm to about 300 μm. The wall thickness of the microcapsules may be, for example, about 100 nm to about 3 μm. The liquid monomer-filled microcapsules may be the same, or similar to, the microcapsules of U.S. Patent No. 7,566,747, which is incorporated herein by reference. The liquid monomer-filled microcapsules may be synthesized using the methods described therein or any suitable encapsulation procedure known in the art.

Figure 3:
FIG. 3 is a general reaction scheme diagram illustrating the synthesis of a polymer having catalytic endgroups derived from an olefin metathesis catalyst in accordance with some embodiments of the present invention.

Reference is now made to FIG. 3, which is a general reaction scheme diagram that illustrates the synthesis of a polymer having catalytic endgroups derived from an olefin metathesis catalyst in accordance with some embodiments of the present invention. The polymer having catalytic endgroups is synthesized via solution polymerization or suspension polymerization of a ring-opening metathesis-active monomer (e.g., norbornene, norbornene derivatives such as ethylidene norbornene, or cyclooctadiene) in the presence of an olefin metathesis catalyst (e.g., Grubbs' 1st generation catalyst). The ratio of the ring-opening metathesis-active monomer to the olefin metathesis catalyst is within the range of 10:1 to 10,000:1, preferably within the range of 15:1 to 50:1. Typically, this synthesis is performed at room temperature (RT). Reaction Scheme 1, below, sets forth an example of the general reaction scheme diagram shown in FIG. 3.

Reaction Scheme 1

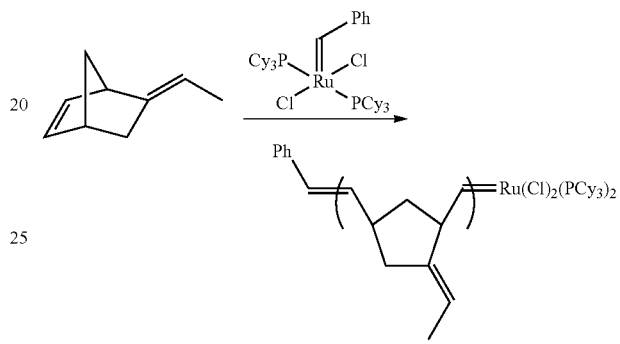

In Reaction Scheme 1, ethylidene norbornene undergoes ring-opening metathesis polymerization in the presence of bis(tricyclohexylphosphine)benzylidene ruthenium dichloride (Grubbs' 1st generation catalyst) to form an ethylidene norbornene-derived polymer having catalytic endgroups. In Reaction Scheme 1, Ph is a phenyl group and Cy is a cyclohexyl group.

If solution polymerization is used to synthesize the polymer having catalytic endgroups, a catalyst stock solution of the olefin metathesis catalyst dissolved in a suitable solvent is added at room temperature to a solution containing the ring-opening metathesis-active monomer while rapidly stifling the reaction mixture; ring-opening metathesis polymerization catalyzed by the olefin metathesis catalyst with rapid stirring forms the polymer having catalytic endgroups. The reaction product is precipitated, filtered and dried. Suitable solvents include, but are not limited to, dichloromethane, toluene, acetone, chlorinated benzenes, 1,2-dichloroethane, diethyl ether, ethyl acetate, tetrahydrofuran (THF), and combinations thereof. If solution polymerization is used to synthesize the polymer having catalytic endgroups, follow-on processing (e.g., grinding, milling, etc.) is used to form the small polymeric particles. This typically results in a relatively large distribution of particle sizes. Narrower size ranges can be isolated through the use of sieves.

On the other hand, if suspension polymerization is used to synthesize the polymer having catalytic endgroups, the polymeric particles are formed directly in the suspension as microparticles (e.g., microspheres, granules, beads, and the like). A catalyst stock solution containing the olefin metathesis catalyst dissolved in a suitable solvent is poured at room temperature into an aqueous solution containing the ring-opening metathesis-active monomer and a surfactant, and then the reaction mixture is formed into a suspension by rapid stifling; ring-opening metathesis polymerization catalyzed by the olefin metathesis catalyst with rapid stifling forms microparticles of the polymer having catalytic endgroups. The microparticles are collected by microfiltration and dried. Suitable surfactants include, but are not limited to, sodium dodecyl sulphate (SDS) and poly(ethylene-co-maleic anhydride) (EMA). Suitable solvents include, but are not limited to, toluene, dichloromethane, acetone, chlorinated benzenes, 1,2-dichloroethane, diethyl ether, ethyl acetate, tetrahydrofuran (THF), and combinations thereof. Particle size may be controlled by varying the stifling rate, i.e., the revolutions-per-minute at which the reaction mixture is stirred. For example, the average diameters of the microparticles obtained decreases as the stirring rates increase. If the size distribution is large, narrower size ranges can be isolated through the use of sieves. Reaction heat is efficiently dispersed by the aqueous medium.

PROPHETIC EXAMPLE 1

Synthesis of a Polymer having Catalytic Endgroups Via Solution Polymerization

In this example, ethylidene norbornene (ENB) is used as the ring-opening metathesis-active monomer, bis(tricyclohexylphosphine)benzylidene ruthenium dichloride (Grubbs' 1st generation catalyst) is used as the olefin metathesis catalyst, and dichloromethane is used as the solvent. A polymer having catalytic endgroups is synthesized via solution polymerization by adding a catalyst stock solution containing the Grubbs' 1st generation catalyst dissolved in dichloromethane into a rapidly stirred solution containing ENB (neat or dissolved in dichloromethane). Ring-opening metathesis polymerization catalyzed by the Grubbs' 1st generation catalyst with rapid stifling forms a polymer having catalytic endgroups (i.e., the polymer shown in Reaction Scheme 1, above).

In an $N_2$-filled glovebox, a catalyst stock solution of Grubbs' 1st generation catalyst (1.22 g, 1.5 mmol) in dichloromethane is sealed in a vial. The vial is removed from the glovebox. ENB (10 mL, 74.3 mmol) is dissolved in 50 mL dichloromethane at room temperature in a 100 mL flask flushed with argon or nitrogen gas and stirred with a mechanical stirrer at 500 RPM. The vial containing the catalyst stock solution is then opened (in air), and the catalyst stock solution is added via syringe at room temperature into the ENB solution and the reaction mixture was allowed to stir. After 30 min, the stirring is stopped. The reaction product is then precipitated by adding the solution dropwise to rapidly stifling methanol at 0° C. Then, the precipitated reaction product is filtered and dried overnight. The dried reaction product may then subjected to a grinding operation to form the small polymeric particles.

PROPHETIC EXAMPLE 2

Synthesis of Microparticles Comprising a Polymer having Catalytic Endgroups Via Suspension Polymerization In this example, ethylidene norbornene (ENB) is used as the ring-opening metathesis-active monomer, bis(tricyclohexylphosphine)benzylidene ruthenium dichloride (Grubbs' 1st generation catalyst) is used as the olefin metathesis catalyst, and poly(ethylene-co-maleic anhydride) (EMA) is used as a surfactant to facilitate formation of a suspension. Microparticles comprising a polymer having catalytic endgroups are synthesized directly via suspension polymerization by pouring a catalyst stock solution containing the Grubbs' 1st generation catalyst into a rapidly stirred, aqueous solution containing ENB and EMA. In the resulting suspension, ring-opening metathesis polymerization catalyzed by the Grubbs' 1st generation catalyst forms microparticles comprising a polymer having catalytic endgroups (i.e., the polymer shown in Reaction Scheme 1, above).

In an $N_2$-filled glovebox, a catalyst stock solution of Grubbs' 1st generation catalyst (1.22 g, 1.5 mmol) in toluene is sealed in a vial. The vial is removed from the glovebox. A solution of water (800 mL), ENB (10 mL, 74.3 mmol), and EMA (4.0 g) is placed at room temperature in a 1000 mL beaker and stirred with a mechanical stirrer at 1000 RPM. The vial containing the catalyst stock solution is then opened (in air), and the catalyst stock solution is poured at room temperature into the aqueous solution. After 60 min, the stirring is stopped. The microparticles are collected by microfiltration, washed with copious amounts of water, and dried under vacuum overnight.

Reference is now made to FIG. 4, which is a general reaction scheme diagram that illustrates the synthesis of a healing polymer during a healing event in accordance with some embodiments of the present invention. A crack, for example, may develop in or on the surface of the self-healing composite material. The crack (e.g., about 1-2 microns wide) may rupture nearby microcapsules when the propagating crack comes in contact with the microcapsules. When this occurs, the ring-opening metathesis-active monomer flows from the microcapsules and fills-in the crack due to capillary action. As the ring-opening metathesis-active monomer flows from the microcapsules, the monomer comes into contact with the polymeric particles comprising a polymer having catalytic endgroups. Contact between the ring-opening metathesis-active monomer flowing from the ruptured microcapsules and the polymeric particles facilitates homogeneous ring-opening metathesis polymerization of the released monomer. The healing polymer is the product of this homogeneous polymerization. The polymerization is homogeneous because catalytic endgroups of the polymer that comprises the polymeric particles are liberated as the polymer dissolves in the released monomer. As noted above, the polymeric particles must be soluble in the monomer. The synthesis of the healing polymer via homogeneous polymerization of the monomer in the crack may then seal the crack. Reaction Scheme 2, below, sets forth an example of the general reaction scheme diagram shown in FIG. 4.

Reaction Scheme 2

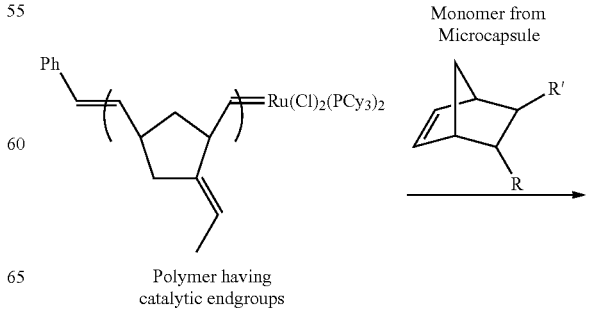

-continued

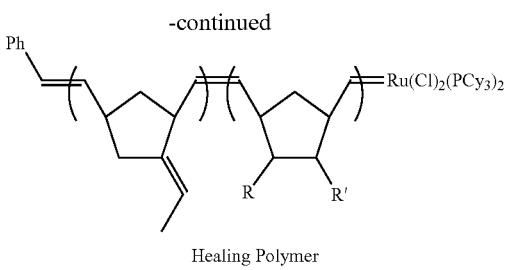

Healing Polymer

In Reaction Scheme 2, a ring-opening metathesis-active monomer flowing from one or more ruptured microcapsules comes into contact with the ethylidene norbornene-derived polymer synthesized in Reaction Scheme 1, and undergoes ring-opening metathesis polymerization to form a healing polymer. In Reaction Scheme 2, Ph is a phenyl group, Cy is a cyclohexyl group, R is a hydrogen atom, an alkyl group, an alkenyl group, or an aryl group, and R' is a hydrogen atom, an alkyl group, an alkenyl group, or an aryl group.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method for fabricating a self-healing composite material comprising:
    providing polymeric particles comprising a polymer having catalytic endgroups derived from an olefin metathesis catalyst;
    dispersing the polymeric particles and microcapsules in a base polymer, wherein the microcapsules are filled with a ring-opening metathesis-active monomer, and wherein the polymer of the polymeric particles is soluble in the ring-opening metathesis-active monomer with which the microcapsules are filled.

2. The method as recited in claim 1, wherein providing the polymeric particles comprises:
    synthesizing the polymer via solution polymerization of at least one ring-opening metathesis-active monomer in the presence of the olefin metathesis catalyst;
    processing the polymer via a grinding operation to form the polymeric particles.

3. The method as recited in claim 2, wherein the olefin metathesis catalyst includes Grubbs' 1st generation catalyst, and wherein the at least one ring-opening metathesis-active monomer is selected from the group consisting of norbornene, ethylidene norbornene, cyclooctadiene, and combinations thereof.

4. The method as recited in claim 3, wherein the ring-opening metathesis-active monomer with which the microcapsules are filled is selected from the group consisting of norbornene, norbornene derivatives, cyclooctadiene, and combinations thereof, and wherein the norbornene derivatives are represented by the following formula:

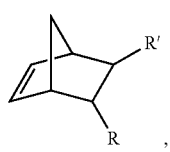

wherein R is a hydrogen atom, an alkyl group, an alkenyl group, or an aryl group, and wherein R' is a hydrogen atom, an alkyl group, an alkenyl group, or an aryl group.

5. The method as recited in claim 4, wherein the at least one ring-opening metathesis-active monomer utilized in synthesizing the polymer includes the same ring-opening metathesis-active monomer with which the microcapsules are filled.

6. The method as recited in claim 1, wherein providing the polymeric particles comprises:
    synthesizing the polymeric particles via suspension polymerization of at least one ring-opening metathesis-active monomer in the presence of the olefin metathesis catalyst.

7. The method as recited in claim 6, wherein the olefin metathesis catalyst includes Grubbs 1st generation catalyst, and wherein the at least one ring-opening metathesis-active monomer is selected from the group consisting of norbornene, ethylidene norbornene, cyclooctadiene, and combinations thereof.

8. The method as recited in claim 7, wherein the ring-opening metathesis-active monomer with which the microcapsules are filled is selected from the group consisting of norbornene, norbornene derivatives, cyclooctadiene, and combinations thereof, and wherein the norbornene derivatives are represented by the following formula:

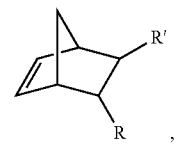

wherein R is a hydrogen atom, an alkyl group, an alkenyl group, or an aryl group, and wherein R' is a hydrogen atom, an alkyl group, an alkenyl group, or an aryl group.

9. The method as recited in claim 8, wherein the at least one ring-opening metathesis-active monomer utilized in synthesizing the polymer includes the same ring-opening metathesis-active monomer with which the microcapsules are filled.

10. The method as recited in claim 1, wherein the polymer of the polymeric particles is represented by the following formula:

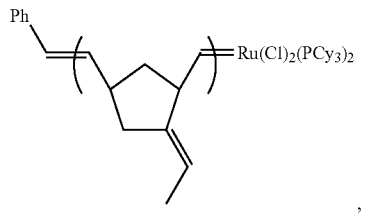

wherein Ph is a phenyl group, and wherein Cy is a cyclohexyl group.

11. The method as recited in claim 10, wherein the ring-opening metathesis-active monomer with which the microcapsules are filled is represented by the following formula:

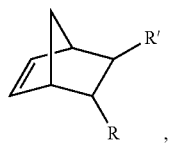

wherein R is a hydrogen atom, an alkyl group, an alkenyl group, or an aryl group, and wherein R' is a hydrogen atom, an alkyl group, an alkenyl group, or an aryl group.

12. The method as recited in claim 11, wherein the base polymer includes an epoxy polymer.

13. A method for synthesizing a healing polymer in a self-healing composite material, the method comprising:
providing a self-healing composite material comprising a base polymer, microcapsules dispersed in the base polymer, and polymeric particles dispersed in the base polymer, wherein the microcapsules are filled with a ring-opening metathesis-active monomer, wherein the polymeric particles comprise a polymer having catalytic endgroups derived from an olefin metathesis catalyst, and wherein the polymer of the polymeric particles is soluble in the ring-opening metathesis-active monomer with which the microcapsules are filled;
rupturing the microcapsules to release the ring-opening metathesis-active monomer from the microcapsules and to bring the released monomer in contact with the polymeric particles, wherein the polymer of the polymeric particles dissolves in the released monomer, and wherein the released monomer is homogeneously polymerized in the presence of the catalytic endgroups liberated as the polymer of the polymeric particles dissolves in the released monomer.

14. The method as recited in claim 13, wherein the polymer of the polymeric particles is represented by the following formula:

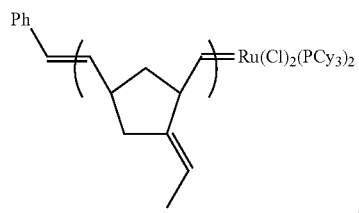

wherein Ph is a phenyl group, and wherein Cy is a cyclohexyl group.

15. The method as recited in claim 14, wherein the ring-opening metathesis-active monomer with which the microcapsules are filled is represented by the following formula:

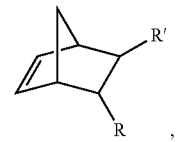

wherein R is a hydrogen atom, an alkyl group, an alkenyl group, or an aryl group, and wherein R' is a hydrogen atom, an alkyl group, an alkenyl group, or an aryl group.

16. The method as recited in claim 15, wherein rupturing the microcapsules to release the ring-opening metathesis-active monomer from the microcapsules and to bring the released monomer in contact with the polymeric particles includes synthesizing a healing polymer represented by the following formula:

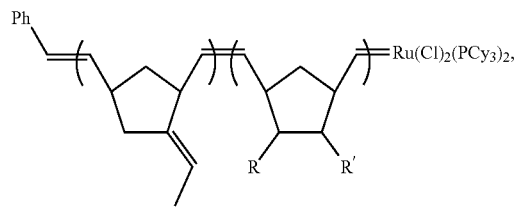

wherein Ph is a phenyl group, and wherein Cy is a cyclohexyl group, wherein R is a hydrogen atom, an alkyl group, an alkenyl group, or an aryl group, and wherein R' is a hydrogen atom, an alkyl group, an alkenyl group, or an aryl group.

17. The method as recited in claim 16, wherein the base polymer includes an epoxy polymer.

18. A self-healing composite material fabricated in accordance with the method recited in claim 1.

* * * * *